United States Patent
Lee et al.

(10) Patent No.: US 7,852,433 B2
(45) Date of Patent: Dec. 14, 2010

(54) BACKLIGHT ASSEMBLY AND DISPLAY DEVICE HAVING THE SAME

(75) Inventors: Seung Chul Lee, Paju-si (KR); Ju Un Park, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 141 days.

(21) Appl. No.: 12/289,280

(22) Filed: Oct. 23, 2008

(65) Prior Publication Data

US 2009/0109372 A1 Apr. 30, 2009

(30) Foreign Application Priority Data

Oct. 24, 2007 (KR) .................... 10-2007-0107242

(51) Int. Cl.
*G02F 1/1335* (2006.01)
*G09F 13/04* (2006.01)

(52) U.S. Cl. .................. 349/62; 349/56; 349/57; 349/61; 349/95; 362/97.2

(58) Field of Classification Search .......... 349/62, 349/56, 57, 61, 64, 95, 201, 202; 362/97.2
See application file for complete search history.

(56) References Cited

U.S. PATENT DOCUMENTS

| 6,157,424 | A  | * | 12/2000 | Eichenlaub ................. 349/74 |
| 6,421,174 | B1 | * | 7/2002 | Ooshima et al. ............ 359/457 |
| 6,600,528 | B2 | * | 7/2003 | Colgan et al. .............. 349/95 |
| 6,791,639 | B2 | * | 9/2004 | Colgan et al. .............. 349/95 |
| 7,580,186 | B2 |   | 8/2009 | Mather et al. |
| 2005/0180005 | A1 | * | 8/2005 | Hwang et al. ............... 359/457 |
| 2006/0050197 | A1 | * | 3/2006 | Hu et al. .................... 349/61 |
| 2006/0279547 | A1 | * | 12/2006 | Karman et al. ............. 345/169 |
| 2009/0109372 | A1 | * | 4/2009 | Lee et al. ................... 349/62 |

FOREIGN PATENT DOCUMENTS

| CN | 1591088 | 3/2005 |
| CN | 1836178 | 9/2006 |
| WO | WO 2005/017581 | 2/2005 |

* cited by examiner

*Primary Examiner*—Brian M Healy
(74) *Attorney, Agent, or Firm*—McKenna Long & Aldridge LLP

(57) ABSTRACT

A backlight assembly includes: a light source forming light; and a multi-focusing sheet focusing the light provided by the light source in at least two regions.

8 Claims, 3 Drawing Sheets

BACKLIGHT ASSEMBLY AND DISPLAY DEVICE HAVING THE SAME

This application claims the benefit of Korean Patent Application No. 10-2007-0107242, filed on Oct. 24, 2007, which is hereby incorporated by reference for all purposes as if fully set forth herein.

BACKGROUND OF THE INVENTION

1. Field of the Invention

The present invention relates to a backlight assembly focusing light in at least two regions and a multiview display device having the backlight assembly.

2. Discussion of the Related Art

A display device of related art provides the same image over a wide viewing angle range and to a plurality of users at the same time. When a single display device is used, it is difficult to simultaneously provide various images requested by a plurality of users so that individual watching preference is often disregarded.

To address the above problem, a multiview display device displaying different images in different directions has been developed. The multiview display device displays different images in at least two directions so that users located in the different directions may freely watch desired images. For example, when a multiview display device is provided in a navigation apparatus, a driver may receive a road condition information while a passenger may receive other information such as movie, or news.

The multiview display device includes a display panel displaying an image and a barrier substrate separating an image provided to the display panel in different directions. The display panel may use a liquid crystal panel that is small and compact and consumes less power. The liquid crystal displays an image using light provided by, for example, a backlight unit. In the multiview display device, since the light provided by the backlight unit is blocked by the barrier substrate, a light efficiency is deteriorated.

Also, the backlight unit providing light to a general liquid crystal panel is designed to focus the light in a direction perpendicular to a plane of the liquid crystal panel to present a wide viewing angle. In other words, the backlight unit uniformly provides light over the overall surface of the liquid crystal panel. Accordingly, when a related art backlight unit is applied to the multiview display device, the multiview display device has a higher brightness in the front direction than in a main viewing angle direction along which an image is displayed. Thus, the brightness of the multiview display device is deteriorated.

Furthermore, since the multiview display device displays different images in at least two regions, the images may overlap each other. In doing so, if the multiview display device has a uniform brightness, an image overlap phenomenon may be maximized.

SUMMARY OF THE INVENTION

Accordingly, the present invention is directed to a backlight assembly and display device having the same that substantially obviate one or more of the problems due to limitations and disadvantages of the related art.

An advantage of the present invention is to provide a backlight assembly capable of focusing light in at least two regions and a multiview display device having the backlight assembly which may improve brightness of the two regions displaying different images.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight assembly includes a light source forming light and a multi-focusing sheet focusing the light provided by the light source in at least two regions.

The multi-focusing sheet may haves a prism vertical angle facing the light source. The prism vertical angle may be in a range of 70°-90°. Alternately, the prism vertical angle may be in a range of 90°-110°.

The multi-focusing sheet may focus light at an angle of 20°-60° to the left and right sides with respect to the center of a liquid crystal panel.

The multi-focusing sheet may include a prism pattern having a direction crossing a direction in which light is focused.

In another aspect of the present invention, a display device includes a liquid crystal panel having a plurality of pixels displaying an image, a barrier mask disposed on a front surface of the liquid crystal panel, a light source disposed on a rear surface of the liquid crystal panel and providing light to the liquid crystal panel, and a multi-focusing sheet interposed between the liquid crystal panel and the light source and focusing the light in at least two regions of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF ILLUSTRATED EMBODIMENTS

Figure 1:
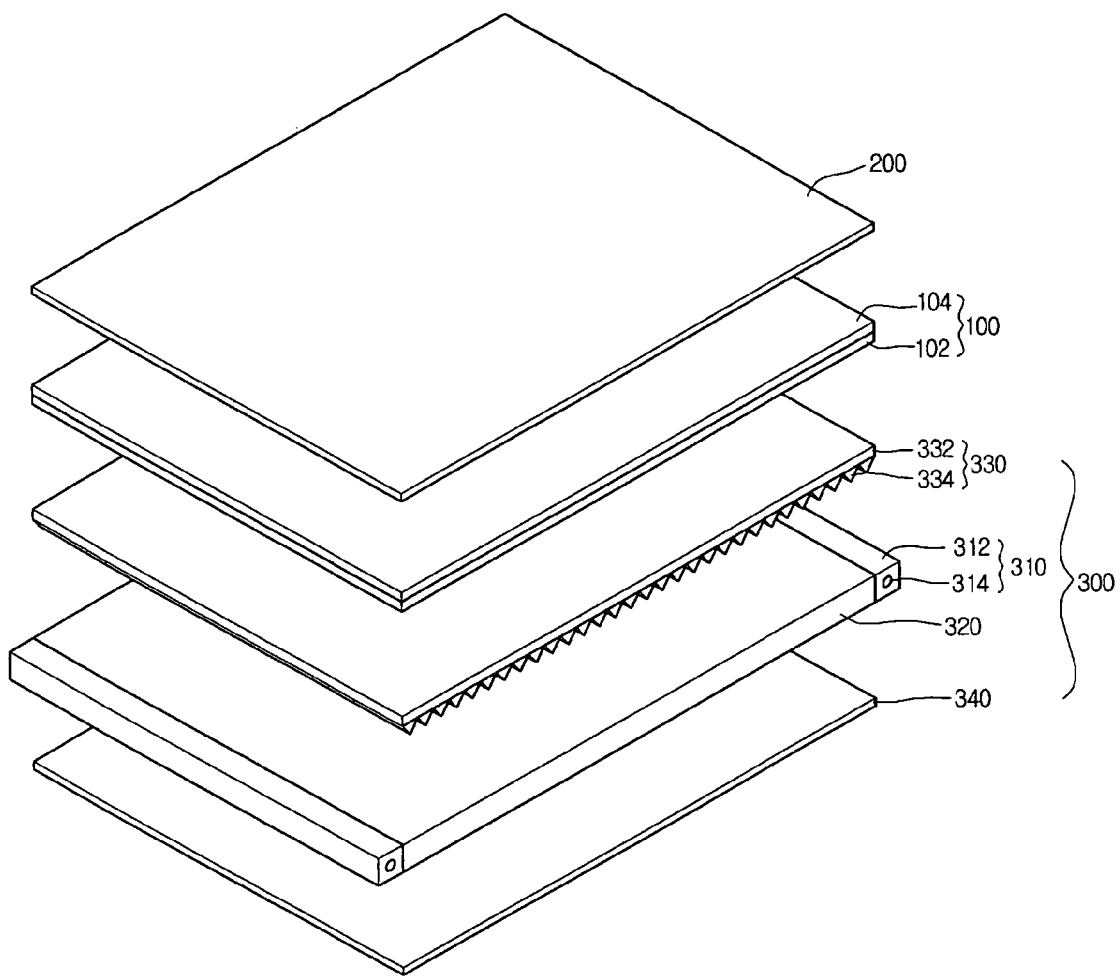
FIG. 1 is a perspective view of a display device according to an embodiment of the present invention.

Reference will now be made in detail to embodiment(s) of the present invention, example of which is illustrated in the accompanying drawings. These embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
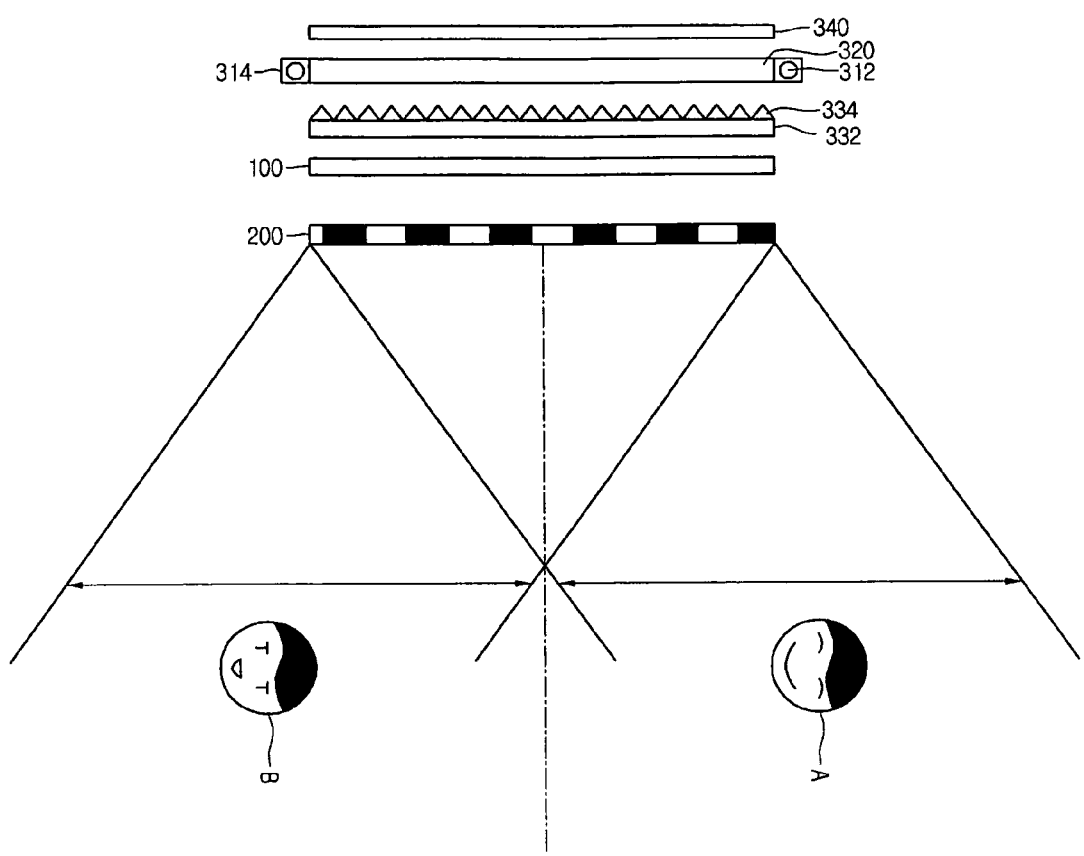
FIG. 2 is a cross-sectional view of the display device of FIG. 1.

FIG. 1 is a perspective view of a display device according to an embodiment of the present invention. FIG. 2 is a cross-sectional view of the display device of FIG. 1.

Referring to FIGS. 1 and 2, the display device displays different images in at least two viewing angle directions. For example, the display device may display first and second images A and B in first and second viewing angle directions.

The display device includes a liquid crystal panel 100, a barrier mask 200, and a backlight assembly 300. The liquid crystal panel 100 includes first and second substrates 102 and 104 facing each other and a liquid crystal layer (not shown) interposed between the first and second substrates 102 and 104. The first substrate 102 includes a plurality of pixels for displaying an image. Although it is not illustrated in the drawings, each pixel includes a TFT and a pixel electrode. Also, the second substrate 104 includes a color filter and a common electrode. The liquid crystal layer is interposed between the pixel electrode and the common electrode. The arrangement state of liquid crystal molecules in the liquid crystal layer may be adjusted by an electric field formed between the pixel electrode and the common electrode. The arrangement state of the liquid crystal molecules adjusts the transmissivity of light transmitting the liquid crystal layer, thereby displaying an image.

In the present embodiment, although a liquid crystal panel mode is described to be a TN mode, the liquid crystal panel 100 may be a different mode. For example, the liquid crystal panel model may be a VA mode, an IPS mode, or an FFS mode.

The barrier mask 200 is arranged on the front surface of the liquid crystal panel 100 to display an image in at least two viewing angle directions. The barrier mask 200 includes a transmission portion transmitting light and a blocking portion blocking light.

Figure 3:
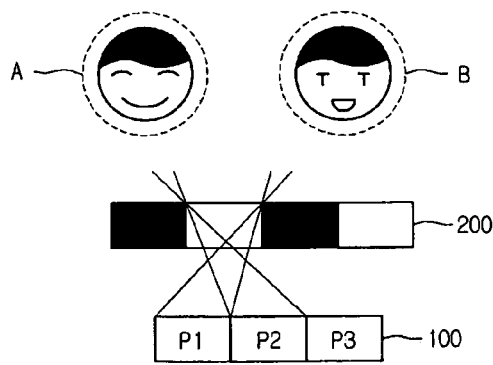
FIG. 3 illustrates that the display device displays a multi-view image.

FIG. 3 illustrates that the display device displays a multi-view image. Referring to FIG. 3, the transmission portion exposes portions of first and second pixels P1 and P2 neighboring each other. The first pixel P1 provides a part of the second image B while the second pixel P2 provides a part of the first image A. A person located in a first viewing angle direction may watch a part of the second pixel P2 via the transmission portion, thereby watching the first image A. Contrarily, a person located in a second viewing angle direction may watch a part of the first pixel P1 via the transmission portion, thereby watching the second image B. In other words, the persons located at different positions may see different pixels through a single transmission portion so that the persons may watch different images.

Referring back to FIGS. 1 and 2, the barrier mask 200 includes a transparent substrate and a light shield pattern arranged on the substrate and having an opening portion exposing a part of the substrate. The opening portion may have, for example, a stripe shape.

The backlight assembly 300 includes a light source portion 310 generating light, a light guide plate 320 guiding the light toward the liquid crystal panel 100, and a multi-focusing sheet 330 transmitting the light provided by the light guide plate 320 and focusing the light in at least two viewing angle directions.

The light source portion 310 includes a light source 314 generating light and a reflection panel 312 having an opening corresponding to the light guide plate 320 and housing the light source 314. Although in the drawings the light source 314 is arranged at both sides of the light guide plate 320, the light source may be otherwise arranged. The reflection panel 312 reflects the light emitted in a direction opposite to the light guide plate 320 to proceed toward the light guide plate 320 so that a light efficiency may be improved.

The light guide plate 320 is arranged at a side of the light source portion 310 and the changes the optical path of the light provided by the light source portion 310 to provide the light to the liquid crystal panel 100. In addition, a reflection substrate 340 may be further arranged under the light guide plate 320. The reflection substrate 340 reflects the light leaking in a direction opposite to the liquid crystal panel 100 to proceed toward the liquid crystal panel 100, thereby improving the light efficiency.

The multi-focusing sheet 330 changes the optical path of the light provided in a non-viewing angle direction for not displaying an image to a main viewing angle direction for displaying the image. In other words, the multi-focusing sheet 330 focuses light in at least two regions of the liquid crystal panel 100. Accordingly, the multi-focusing sheet 330 may improve brightness in at least two viewing angle directions of the display device. Also, the display device having the multi-focusing sheet 330 has a higher brightness in the main viewing angle direction than in the non-viewing angle direction, an image overlapping phenomenon may be reduced or prevented.

The multi-focusing sheet 330 may include a plurality of prism patterns 334 having a direction crossing the main viewing angle direction. Also, each of the prism patterns 334 of the multi-focusing sheet 330 may have a prism vertical angle facing the light guide plate 320. Accordingly, the multi-focusing sheet 330 may focus the light at at least both sides of the liquid crystal panel 100.

The multi-focusing sheet 330 may focus the light in a particular direction by adjusting an angle α of the prism vertical angle. For example, the display device may display different images at least in both side directions of the front direction.

The multi-focusing sheet 330 may focus the light at an angle of 20-60° to the left and right sides with respect to the liquid crystal panel 100. To this end, the angle α of the prism vertical angle may be in a range of 70-90°. Also, the angle α of the prism vertical angle may be in a range of 90-110°.

That is, the multi-focusing sheet 330 may include the prism patterns 334, each having a shape of an equilateral triangle, and a body portion 332 supporting the prism patterns 334. The prism patterns 334 may have the same shape when a plurality of prism patterns are to be arranged. The prism patterns 334 and the body portion 332 may be integrally formed or made of different materials. The multi-focusing sheet 330 may be formed of thermosetting resin or UV curing resin.

In addition, although it is not illustrated in the drawings, a protection layer covering the prism patterns 334 of the multi-focusing sheet 330 may be further arranged. The protection layer protects the surface of the multi-focusing sheet 330. Also, a diffusion sheet may be further provided between the light guide plate 320 and the multi-focusing sheet 330. The diffusion sheet diffuses light output from the light guide plate 330 to uniformly proceed toward the multi-focusing sheet 330.

In the present embodiment, although the backlight assembly 300 is described to be an edge type, the backlight assembly 300 may be a direct type. The multi-focusing sheet 330 is arranged between the light source and the liquid crystal panel 100. The prism vertical angle of the multi-focusing sheet 330 may be arranged to face the light source.

Figure 4:
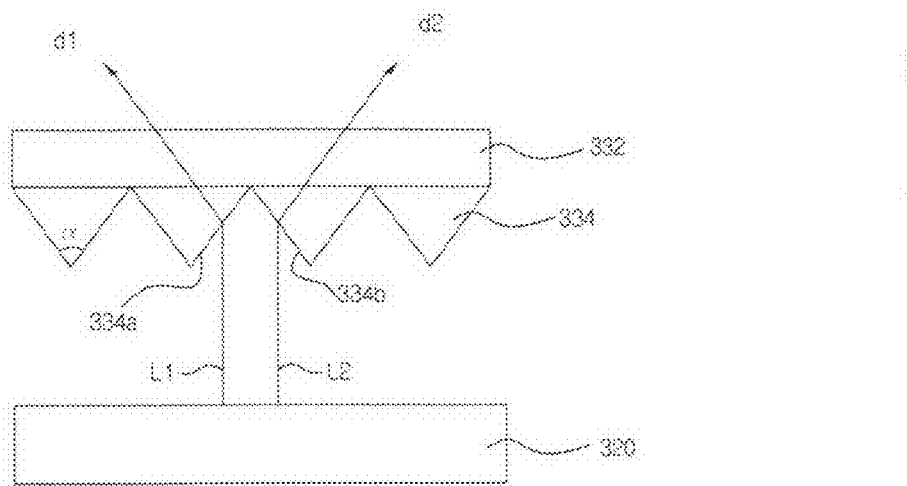
FIG. 4 is a cross-sectional view showing the optical path of a backlight assembly provided in the display device according to an embodiment of the present invention.

FIG. 4 is a cross-sectional view showing the optical path of a backlight assembly provided in the display device according to an embodiment of the present invention. Referring to FIG. 4, each of the prism patterns 334 of the multi-focusing sheet 330 has a prism vertical angle facing the light guide plate 320. Also, each of the prism patterns 334 has a first surface 334a and a second surface 334b meeting at the prism vertical angle.

The light emitted from the light source portion 310 proceeds toward the side surface of the light guide plate 320 and is emitted by the light guide plate 320 to the front direction. The light emitted by the light guide plate 320 is provided to the multi-focusing sheet 330. The multi-focusing sheet 330 separates and emits the light emitted by the light guide plate 320 in the first and second viewing angle directions d1 and d2 that are angled with respect to the front direction.

For example, the light emitted by the light guide plate 320 may include the first and second lights L1 and L2. Part of the first light L1 is refracted at the first surface 334a of each of the prism patterns 334 and proceeds in the first viewing angle direction d1 by being changed from the front direction. Also, part of the second light L2 is refracted at the second surface 334b of each of the prism patterns 334 and proceeds in the second viewing angle direction d2 by being changed from the front direction.

Thus, as each of the prism patterns 334 of the multi-focusing sheet 330 has the prism vertical angle facing the light guide plate 320, the light may be focused in at least two viewing angle directions.

Figure 5:
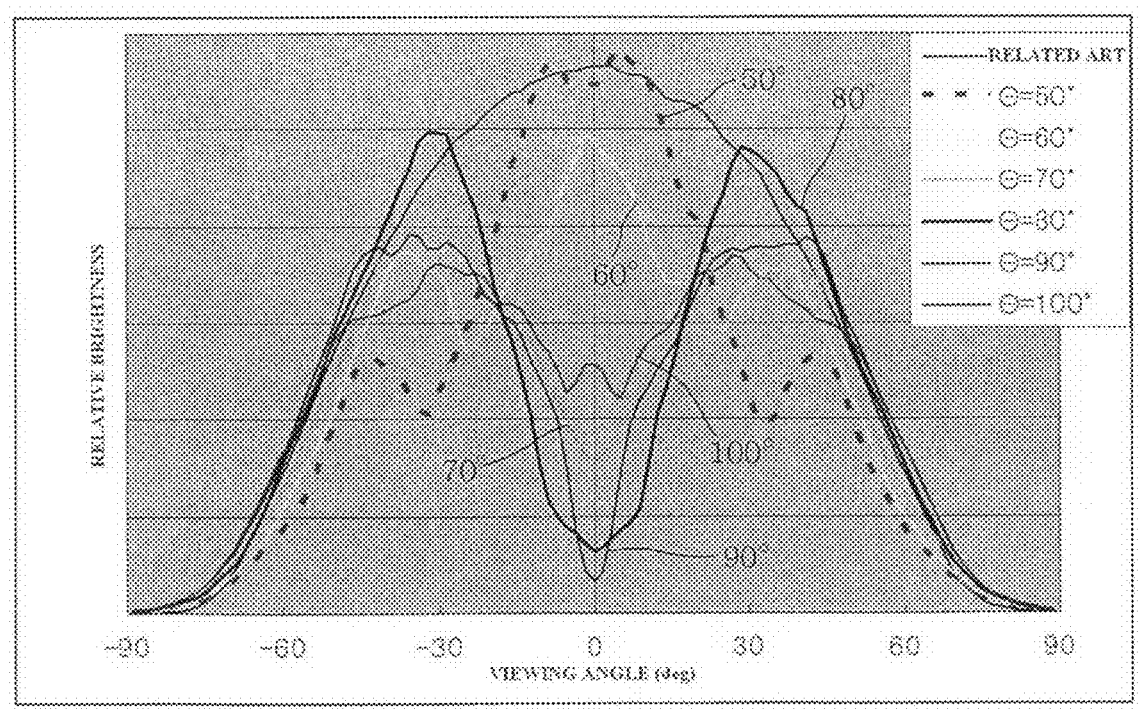
FIG. 5 is a graph showing a brightness distribution according to a viewing angle direction for each vertical angle of a prism.

FIG. 5 is a graph showing a brightness distribution according to a viewing angle direction for each vertical angle of a prism. Referring to FIG. 5, as in the related art, when the prism vertical angle is 90°, assuming that the front direction is 0°, it can be seen that a brightness peak is at a position of 0°. When the prism vertical angle is in a range of 70°-90° or 90°-110°, the brightness peak lies in the left and right sides of the front direction, that is, at positions between −20° through −60° and between 20° through 60°. In particular, when the prism vertical angle is 80°, a big brightness peak is positioned at a particular angle with respect to the front direction, that is, at positions of −30° and 30°.

Thus, it can be seen that the multi-focusing sheet adjusts the focusing region of the light by adjusting the prism vertical angle. In particular, when the prism vertical angle is in a range of 70°-90° or 90°-110°, the light is separated and focused in at least two regions.

As described above, according to embodiments of the display device of the present invention, in displaying different images in at least two viewing angle directions in a single screen, since the multi-focusing sheet focuses light in the respective viewing angle directions along which different images are displayed, the brightness of the display device may be improved. Also, since the brightness in a viewing angle region in which no image is displayed may be reduced compared to that of the main viewing angle direction in which an image is displayed by the multi-focusing sheet, the image overlap phenomenon may be minimized so that visibility and image quality may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight assembly comprising:
   a light source forming light having a first light and a second light; and
   a multi-focusing sheet focusing the light provided by the light source in at least two regions,
   wherein the multi-focusing sheet includes a prism pattern having a direction crossing a direction in which light is focused,
   wherein the first light is refracted at a first surface of the prism pattern and the second light is refracted at a second surface of the prism pattern.

2. The backlight assembly claimed as claim 1, wherein the multi-focusing sheet includes a prism vertical angle facing the light source.

3. The backlight assembly claimed as claim 2, wherein the prism vertical angle is in a range of 70°-90°.

4. The backlight assembly claimed as claim 2, wherein the prism vertical angle is in a range of 90°-110°.

5. The backlight assembly claimed as claim 1, wherein the multi-focusing sheet focuses light at an angle of 20°-60° to the left and right sides with respect to the center of a liquid crystal panel.

6. The backlight assembly claimed as claim 1, further comprising a light guide plate guiding the light provided by the light source toward the multi-focusing sheet.

7. A display device comprising:
   a liquid crystal panel having a plurality of pixels displaying an image;
   a barrier mask arranged on a front surface of the liquid crystal panel;
   a light source arranged on a rear surface of the liquid crystal panel and providing light to the liquid crystal panel; and
   a multi-focusing sheet interposed between the liquid crystal panel and the light source and focusing the light in at least two regions of the liquid crystal panel,
   wherein the multi-focusing sheet includes a prism pattern having a direction crossing a direction in which light is focused,
   wherein the first light is refracted at a first surface of the prism pattern and the second light is refracted at a second surface of the prism pattern.

8. The display device claimed as claim 7, wherein the multi-focusing sheet includes a prism vertical angle facing the light source and having an angle in a range of 70°-90° or 90°-110°.

* * * * *